Inventor
Hermann Anschütz-Kaempfe
By Pennie, Davis, Marvin & Edmonds
Attorneys

Aug. 29, 1933.  H. ANSCHÜTZ-KAEMPFE  1,924,688
GYROSCOPIC COMPASS
Filed Sept. 1, 1928   3 Sheets-Sheet 2

Inventor
Hermann Anschütz-Kaempfe
By Pennie, Davis, Marvin & Edmonds
Attorneys

Patented Aug. 29, 1933

1,924,688

UNITED STATES PATENT OFFICE 1,924,688

GYROSCOPIC COMPASS

Hermann Anschütz-Kaempfe, Munich, Germany, assignor to Nederlandsche Technische Handel Maatschappij "Giro."

Application September 1, 1928, Serial No. 303,582, and in Germany September 8, 1927

5 Claims. (Cl. 33—226)

This invention relates to gyroscopic apparatus such as gyroscopic compasses and the like, and has particular reference to the complete stabilization of a gyroscopic system such as a compass and repeater system without the use of a separate gyroscope or gyroscopes for this apparatus.

In gyroscopic compasses with transmission from the master compass to systems under remote control such as repeater compasses the position of the gyro system giving the direction and containing the gyroscopes, is in the systems used prior to my invention transmitted to the follow up system by the co-operation of two elements of which one element is carried by the gyroscope system, and the other by the follow up system. In the case of multi-gyroscope compasses, the direction-giving or indicating system is stabilized against rotation at least about two principal axes, frequently about all the three principal axes, the suspension containing the follow up system has in itself no stabilization at all. This does not mean any substantial disadvantage when the compass is mounted on land or on a ship which does not roll and steers a straight course, but on a rolling ship the non-stabilized suspension swings, as it were, round the stabilized gyroscope system, and on account of these oscillations, changes the position of the direction transmitting elements relatively to each other, with the result that one of said elements is held in the horizontal plane, while the other oscillates up and down. When these oscillations attain a large amplitude, the co-operation of the two elements becomes unreliable and the oscillations are liable to cause deviations in the position of the follow-up system and of the direction giving system, as the reference planes of the two systems for the measurement do not permanently coincide. Consequently on rolling and pitching ships the repeater compasses are liable to give a false indication of turning, which the indicating system does not make at all. For the ordinary purposes of navigation, this fact does not need consideration, as the average indication remains unchanged, and the quartermaster who steers the ship at sea does not alter the helm at once in response to any change of course indicated by the compass, but follows the average indication.

In the case of gyroscopic compasses which are to give the course of the ship at any time with the greatest possible accuracy, for instance for the control of automatic steering gear, it appears desirable that the follow up system also be permanently kept in the horizontal position, so that the relative movement of the transmitting elements takes place with reference to a plane stationary relatively to the earth face, instead of in a plane affected by the movement of the ship, and one object of my invention is to effect the stabilization of the follow up system supported by a suitable suspension, by means of simple devices reliable in operation.

Another object of my invention is to make provisions for a remote control of repeater compasses or other devices mounted on the same vehicle as the master compass and subject to the requirement of being permanently in horizontal position, unaffected by the rolling, pitching and turns of the vehicle in which they are mounted. In certain gyroscopic compasses which have been developed prior to my invention the suspension is stabilized by a separate gyroscope, which may be independent from the indicating gyroscope system (German Patent 305,625) or may depend in operation on the same (U. S. Patent No. 1,493,213). The invention differs therefrom in that no separate gyroscopes are required. In the preferred embodiment of my invention, there are provided follow up motors adapted to turn the suspension in any direction, and responsive to any relative movement of the horizontal plane of the gyroscope system relatively to the ship, to turn the suspension in opposition to any movement of the ship whereby said suspension always remains in the horizontal position, just as the gyroscope system. While in the gyroscope systems known prior to my invention a single follow-up motor was connected with the suspension to maintain the latter in registration with the gyroscope proper, the novel compass embodying my invention has preferably three follow-up motors, one of which acts in the well known manner to turn the suspension about the vertical axis and is intended for indicating the course or transmitting the same to repeater compasses, while the two other motors act about two horizontal axes, to maintain the suspension horizontal. Their movement may be transmitted to a remote indicator to give indication of the angle of rolling and pitching of the ship. The arrangement may also be provided in such a manner that any desired two horizontal axes of the ship, or two horizontal axes allotted to the gyroscope system, for instance the N. S. and the E. W. axis, form the basis for the measurement of all turns of the ship and will be used for the stabilization of the follow up system within the horizontal plane.

One of the features of novelty consists, therefore, in that the follow-up system is turned under the control of the direction giving gyroscope system not only about one axis as has been the practice prior to my invention, but about three axes so that it closely follows all movements of the gyroscope system and, consequently, has in every respect the same direction as the gyroscope system. In that way, not only the disadvantage mentioned in the beginning is eliminated, but in addition the result is obtained that the follow-up system indicates by its position not only the meridian, but also the horizon, and that distant transmission of all the three direction components can be effected by means of the follow up motors.

The possibilities of application of the invention are very numerous. Thus, for instance, a repeater compass of the well known kind, which is suspended by means of a Cardan joint, can be stabilized about the two Cardan axes by the master compass, that is to say its card is always maintained horizontal which is of importance for observation of the stars.

Other objects and features of novelty will appear from the description following hereinafter and from the claims.

For a better understanding of this invention, reference is made to the accompanying drawings, in which Figure 1 illustrates a master gyroscopic compass arranged with the stabilizing mechanism of this invention;

Figure 1:
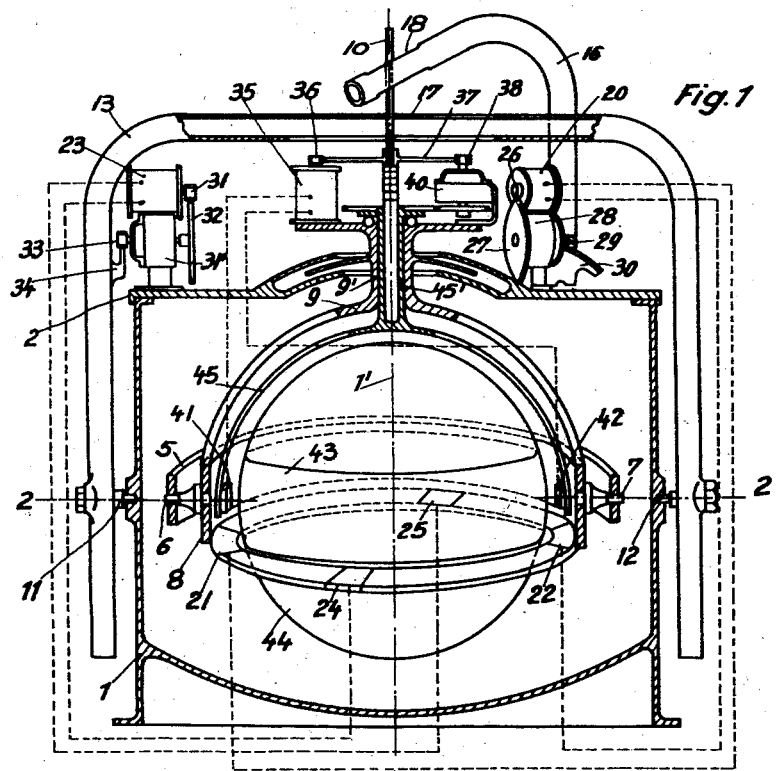

Referring particularly to Fig. 1, the compass bowl or support 1 containing an electrolyte is closed by a cover 2 which at the same time forms the bed plate for the follow up motors of the horizontal stabilization and is mounted on the vehicle, e. g. on a ship, to partake in all movements of the same. The bowl 1 is provided with two pins or journals 3 and 4 for a Cardan ring 5. In the latter is rotatably mounted by means of the pins 6 and 7 a ring 8 having an upwardly extending bail or bracket 9 as will appear from Fig. 1. The latter has a neck 9' in which a sleeve 45' is mounted in an easily rotatable manner, preferably on balls. Into said sleeve is inserted a pin 10 projecting upwards.

The compass bowl is further provided on its outside wall with bearing bosses for pins 11 and 12 which carry a bracket 13 preferably made of metal tube. Turned through an angle of 90° a similar arrangement is provided on the compass bowl in the form of pins 14 and 15, Figure 2, carrying a bracket 16 which is shown broken off in Figure 1. These brackets 13 and 16 are provided at their top portion with longitudinal slots 17 and 18 through which projects the above mentioned vertical pin 10.

Figure 2:
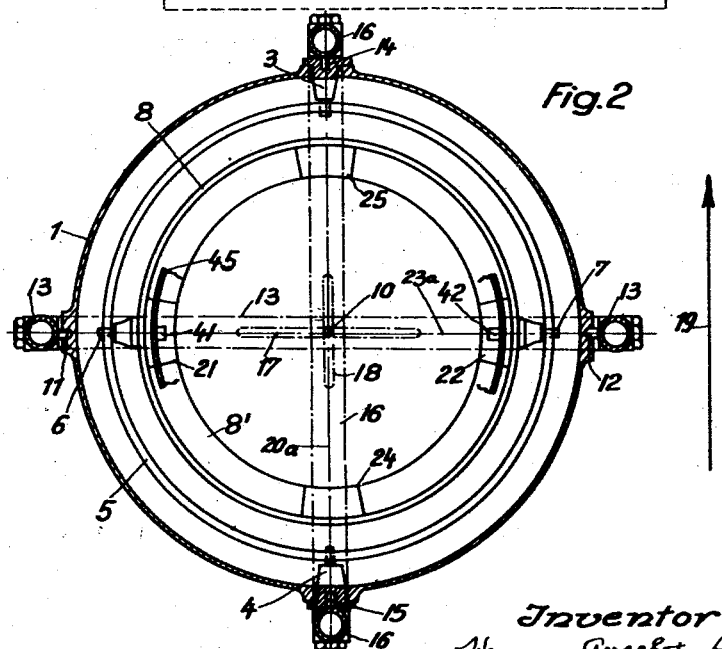
Fig. 2 is a transverse section thereof as seen along the line 2—2 of Fig. 1.

The apparatus is installed on the vehicle in such a manner that the arrow 19 in Figure 2 is parallel to the longitudinal axis of the vehicle and that the axis 1' is in vertical position thereto. If the pin 10 were held fast in the absolute vertical, it would slide to and fro in the slot 17 without meeting with any resistance during the pure rolling movements of the ship and would oscillate the bracket 16, while during pure pitching movements it would slide in the slot 18 and oscillate the bracket 13. In the case of combined rolling and pitching motion, it would swing both brackets relatively to the bowl 1. The position of the bracket 16 would therefore give at any time the angle of rolling and the position of the bracket 17 the angle of pitching of the ship, and these angles could be indicated by suitable means, such as pointer on the bracket and a scale on the compass bowl.

In reality the process is a reverse one as pin 10 does not drive the brackets 16 and 13, but the brackets are motor-driven to drive pin 10 into the position in which it is absolutely vertical. The motors are under the control of the gyroscope system. The point of intersection of the two slots of the brackets in which the pin 10 is situated, consequently, will always be maintained in the position which corresponds to the absolute vertical position of the pin. The oscillations of the brackets relatively to the compass bowl or the ship, therefore, represent the angles of rolling and pitching of the ship at any time. These oscillations of the brackets are preferably transmitted to the card of a corresponding repeater compass, which may be constructed similar to the master compass illustrated, but not stabilized in itself and may include a pin which corresponds to the pin 10 and is, consequently, permanently kept in absolutely vertical position, whereby a primary object of the invention is achieved.

For the purpose of causing the brackets to closely follow the movements of the gyroscope system relatively to the compass bowl, servomotors 20 and 23 are arranged, similar to the arrangement of Patent No. 1,539,039 and are controlled by the displacement of the ball-shaped gyroscope system 44 relatively to the rings 5 and 8 which are operatively connected with the brackets for common movement as will appear from the foregoing description. The ring 8 carries current conducting faces each of which are connected to one terminal of a suitable source of current, the other terminal of which is connected to corresponding conducting faces provided on the ball-shaped gyroscope system floating in the conducting supporting liquid in the compass bowl so that an electric current will pass through the fluid in dependence on the conducting resistance which the supporting liquid offers to the passage of the electric control or steering current. It is obvious that a change in the position of the ball relative to the ring 8 will affect said resistance. The latter controls the motors so that the operation of the same is under permanent influence of the gyroscope system.

The servomotor 20 adapted to swing the bracket 16 in accordance with the rolling angle is controlled by a pair of conducting faces 21, 22 provided at diametrically opposite points of a flange 8' of ring 8. The servomotor 23 adapted to move the bracket 13 corresponding to the angle of pitching is controlled by a pair of conducting faces 24, 25 which are also provided on flange 8' displaced by 90° with regard to the faces 21, 22. The servomotor 20 mounted on the cover 2 by a suitable bracket not has a pinion 26 which meshes with a gear wheel 27 of a transmitter 28 for distant transmission. To the same spindle is rigidly secured a pinion 29 which meshes with a toothed sector 30 attached to the bracket 16. The distant transmitter 28 serves to control a coordinated motor in the repeater unit which will be described hereinafter, and is so constructed as to ensure that the number of revolutions performed by said co-ordinated motor is in a predetermined ratio to the number of revolutions of motor 20. As such transmitters which are to ensure synchronism of two motors are well known in the art a description thereof is not given herein. In the same way, the motor 23 mounted on cover 2 is fitted with a pinion 31 driving the gear 32 of a transmitter which is in operative connection with a toothed sector 34 mounted on a bracket 13 by means of a pinion 33.

Also for the follow-up movement about the third axis, namely the vertical one, there is provided a servomotor 35 mounted on a flange of the sleeve 9' and operating a distance transmitter 40 mounted on the same flange, by means of pinions 36 and 38 and of a gear 37 rigidly mounted on pin 10 as will appear from Fig. 1. The servomotor 35 is controlled by conducting faces 41, 42 mounted on the lower ends of a fork-shaped bracket 45 integral with the sleeve 45'. The three pairs of conducting faces 21 and 22, 24 and 25 and 41 and 42 co-operate with a conducting face 43, shown in Figure 3, provided on the outside surface of the ball-shaped casing of the direction-giving gyroscopic system 44 the construction and arrangement of which is disclosed in the above-mentioned Patent No. 1,589,039.

The gyroscopic system floats perfectly freely in the electrically conducting supporting liquid without being in any kind of mechanical contact with the surrounding parts of the apparatus, and is maintained in its normal position by automatically controlled electric or magnetic forces of attraction or repulsion which are generated by electric currents, the strength of which depends on the resistance which the supporting liquid offers at the time to their passage. The parts producing this action are omitted in the drawing for sake of simplicity. The gyroscopic system 44 preferably contains several gyroscopes which are arranged in the manner disclosed in the British patent to Anschütz No. 10440/11 or the German Patent No. 241,637 and create the directive power causing the system to point to the north and maintain the equator of the spherical system in the horizontal plane.

Figure 3:
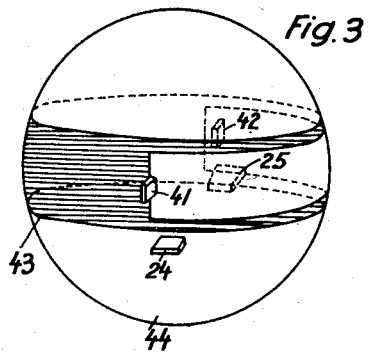
Fig. 3 illustrates in perspective the spherical gyroscopic unit with the electrical contact elements associated therewith.

The position shown in Figure 3 is the position in which the fork-shaped bracket 45 which is carried by the above mentioned rotatable sleeve 45' and in its turn carries the conducting faces 41 and 42 in diametrically opposite positions does not register with the position of the gyroscopic system 44 as far as the direction relatively to the meridian is concerned. The conducting face 43 on the ball-shaped system 44 is formed by a layer of conductive material having the geometrical shape of a ball zone which is recessed to form two vertical rims, as will appear from Fig. 3. When the fork-shaped bracket 45 is not in registration with the system 44 the one face, e. g. 41, is nearer to its co-ordinated vertical rim of the contact face 43 than the other face 42. A source of current 48 has one pole connected to the conductive face 43 and the other pole to the various conducting faces on the bracket 45 and on the ring 8 so that a current is flowing from the contact surface 43 into the conductive faces 41 and 42.

Owing to the shorter distance between 43 and 41 the electric resistance is smaller than between 43 and 42, whereby more current is caused to flow into the conductor connected to 41 than into that connected to 42. The excess of current in one branch over the other, however, serves to cause the servomotor 35 to rotate in one or in the other direction and to rotate gear 31, pin 10, sleeve 45' and bracket 45 with the faces 41 and 42, whereby the distances of the latter from the vertical rims of the layer 43 are equalized and the difference of the two currents is balanced. In this manner the bracket 45 is automatically held to closely follow any rotation of the system 44 about its vertical axis so that it constantly assumes the same position relatively to the meridian as does the gyroscopic system 44.

Figure 4:
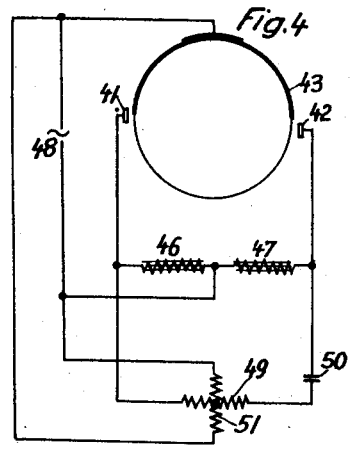
Fig. 4 illustrates diagrammatically the electrical circuit of this invention.
Figure 5:
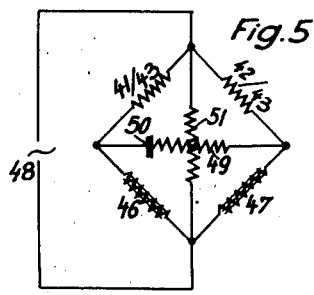
Fig. 5 illustrates diagrammatically an explanatory electrical circuit to be used in connection with the circuit shown in Fig. 4.

A preferred embodiment of the electric connection is shown in Figure 4 and 5. The wide unrecessed portion of the contact surface 43, Figure 3, is shown in horizontal section. 46 and 47 are two choke coils of equal design having their adjacent terminals connected to a source of alternating current 48 and the other terminals connected to the conducting faces 41, or 42 respectively, and to a coil 49 which is connected in series to a capacity 50. 51 indicates a coil of the motor 35, which is so constructed that its direction of rotation depends on the direction in which the current flows through its other coil 49. As such motors are well known and available on the market a description thereof is not given herein. The other pole of the source of current 48 is connected to a suitable conductive face which is near to the face 43 or to some other face on the ball 44 connected to face 43 to transmit the current to the latter.

Figure 5 shows diagrammatically the connection with the same reference numbers in order to evidence that it corresponds completely to a Wheatstone bridge. The numbers 41/42 and 42/43 indicate the variable liquid resistance between the faces 41 and 42 on the one hand, and the face 43 on the other hand. The coil 51 of the motor 35 is also connected to the alternating current source 48, so that the motor will start in one or the other direction, in dependence upon whether the resistance is greater at 41 or at 42, and will discontinue its rotation when the two resistances, owing to full registration of the bracket 45 and the vertical rims of face 43, have again become equal to each other, as in this case there will be no current flowing in the branch 49 of the bridge.

As regards the arrangement of the conducting face 43, it may be mentioned that the same serves at the same time as supply line for one phase of the gyroscope operating current and as an element for the heretofore described control of the follow-up movement and the distance transmission without the two functions interfering with each other.

The co-operation of the two pairs of conducting faces 21, 22 and 24, 25 with the face 43 is entirely analogous to that of the pair 41, 42 as the faces 21, 22, 24 and 25 are automatically held in registration with the lower rim of the face 43 by action of the resistance-controlled motors 20 and 23 which are capable of swinging ring 8 about the axes 20a and 23a (Fig. 2) through the intermediary of the brackets 16 and 13 and of pin 10 engaged thereby. The turning of the ring 8 carrying these two pairs, about the vertical axis 1', does not produce any change of resistance in 21, 22 and 24, 25. Only inclinations about the rolling axis or pitching axis start the motors 20 or 23 and cause the brackets 16 or 13 to be turned in opposite direction by the amount of the inclination, so that they always maintain the pin 10 in the vertical given by the gyroscopic system 44. As the electric connections of motor 20 and the coordinated conducting faces 21 and 22 correspond to that illustrated in Figs. 4 and 5, a description thereof is not given herein. The same is the case with motor 31 and the coordinated faces 24, 25.

In order to obtain as symmetrical conditions as possible, I prefer the arrangement shown in which the point of intersection of the three axes 1', 20a and 23a coincides with the centre of the gyroscopic system.

Figure 7:
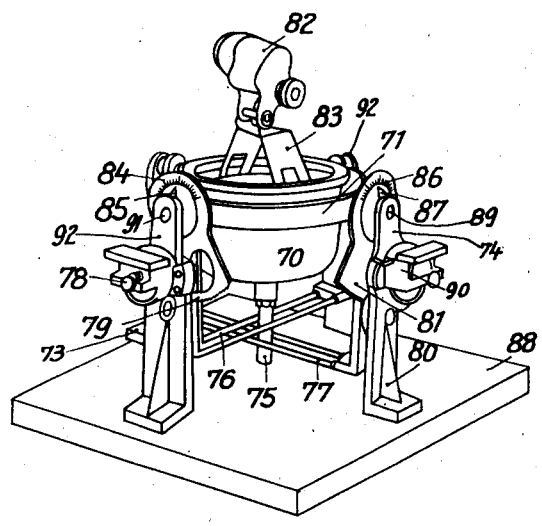
Fig. 7 illustrates in perspective a preferred embodiment of the repeater compass of this invention.

Fig. 7 illustrates a preferred embodiment of the repeater compass controlled by action of the transmitters 28, 32' and 40 to give indication of the direction and to permanently assume an absolutely horizontal position regardless of movements to which the vehicle is subjected.

On a suitable base plate 88 mounted in a fixed special relation to the bowl 1, for instance on the same vehicle as the latter, two upwardly extending brackets 80 and 73 are provided carrying at their upper ends pivots 89 upon which a Cardan ring 71 is rotatably supported. This ring surrounds the casing 70 of a repeater compass which may be of any well-known construction and for this reason has not been illustrated in detail. It may be mentioned, however, that the repeater compass includes a follow-up motor controlled by the transmitter 40 to run synchronously with motor 35, and driving a suitable indicator, giving indication of the north-south direction. The casing 70 is rotatably supported upon pivots (not visible in Fig. 7) fixed to the ring 71 in diametrically opposite points displaced by 90° relative to the pivots around which ring 71 is swingable. The casing 70 is provided with a downwardly extending pin 75 which extends through the slots of two U-shaped, slotted bails 76 and 77 crossing each other. The upwardly extending arms of bail 76 are journaled on pivots 91 inserted in brackets 92 attached to the base plate 88. A toothed segment 79 is attached to one of the upwardly extending arms of the bail 76 and is in engagement with a pinion, not shown, which is operatively connected by suitable gears with the electric motor 78.

The other bail 77 is supported in a similar manner, its upwardly extending arms being pivoted on pivots 89 provided in the brackets 80 and 73, and has attached to it a toothed segment 81 which is in suitable driving connection with a motor 90.

The electric motor 78 is connected with the transmitter 28, while the motor 90 is connected with the transmitter 31'. As heretofore mentioned, the transmitters are operative to control the rotation of the coordinated motor in synchronism with their own rotation. It follows that the number of rotations of motor 23 and the number of rotations of motor 90 are in an invariable ratio to each other. The same is true with regard to the motors 20 and 78. The motor 23 is geared to its coordinated bracket 13 in conformity with the ratio of transmission provided between motor 90 and bail 77. Consequently any rotation of motor 23 will cause the motor 90 to swing the bail 77 through the same angle as the bracket 13 is swung. A corresponding arrangement is provided with regard to bracket 16 and bail 76. The base plate 88 is preferably so mounted that pin 75 is parallel to pin 10. It follows that this parallel relation will always be maintained regardless of rolling, pitching or steering movements to which the vehicle may be subjected.

In the same manner as the casing 70 is thus kept horizontal, any mechanism may be maintained in a definite position unaffected by movements of its base, such as guns or cannons, search lights or so on. In Fig. 7 I have shown a telescope 82 mounted on casing 70. This telescope is thus kept in a definite position so that it does not partake in the movement to which the ship is subjected, but always points into the same direction so that, once it is directed towards some object, the same will remain in the field of view no matter, to which extent the ship may roll, pitch or yaw.

The segments 79 and 81 are provided with scales 84 and 86 which cooperate with hands 85 and 87 giving an indication of the rolling and pitching angle at any time. The scale 84 and the hand 85 may be replaced by any suitable electric contact mechanism causing any desired effect to occur when the ship arrives in a certain position, for instance when it passes through its horizontal position.

While the embodiment heretofore described represents a preferred form of my invention numerous different embodiments may be designed without departing from the spirit of my invention. Thus the follow-up system rotatably about all the axes, may carry two gyroscopic systems instead of one as shown, of which one would be used for indicating and transmitting the meridian, and the other for transmitting the horizontal components to an indicating instrument. Furthermore three gyroscopic systems may be arranged, namely one for each co-ordinate, and instead of one common frame, could be used three single frames, each of which would be stabilized about the axes not yet stabilized by their own gyroscopic system, by means of receiving motors controlled by the other two systems. In the event of a very great accuracy not being required, it would be even possible to arrange three separate gyroscopic systems, the follow-up systems of which are stabilized for the rotation about one axis only and indicate this turning or rotation only.

As my invention primarily contemplates the use of the compass for the indication of the horizon, a special arrangement is preferably provided to ensure that the gyroscope system remains permanently in the horizontal plane. It is a well known fact that this position although it can be set very exactly in the laboratory for a given latitude, is subject to changes when the latitude changes. If for instance in the latitude 52° N. (Rotterdam) the gyroscope axis is set exactly, it would be at an angle of about 6' relatively to the horizon in the latitude 34° S (Buenos Aires), unless special provisions are made.

This example applies also to compasses which are damped by torques about the vertical axis. If, however, the damping is effected by movements of the liquid between the north and south of the gyroscopic system, the difference will amount to a multiple of the said figure and could amount in the above example up to 1°.

Figure 6:
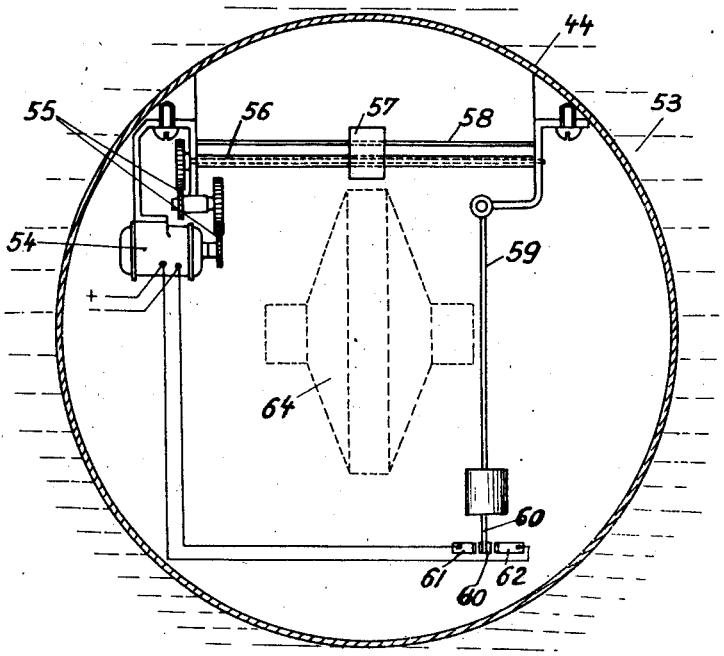
Fig. 6 is an interior vertical view of the gyroscopic unit of the system of this invention.

In order to prevent such a deviation from the horizontal position I mount in the interior of the gyroscope system a sliding weight which is moved in one or in the other direction by a small motor controlled by a pendulum or by an air bubble level which becomes operative as soon as a deviation from the horizontal takes place. A construction of such an arrangement is illustrated by way of example in Figures 6 and 7.

The sealed spherical float casing 44 is entirely or partly supported by the liquid 53. In the float casing is provided a small motor 54 which by means of set 55 of toothed wheel gears is adapted to drive a threaded spindle 56 in one or in the other direction. This spindle 56 carries a movable or sliding nut 57 forming a weight which is guided on and kept from rotation by a bar 58 attached to the float body 44. The nut 57 is, consequently, moved in one or the other direction when the screw spindle 56 is turned. The motor 54 is controlled by a pendulum 59, the point 60 of which touches the contacts 61 or 62 when the gyroscope axis leaves its horizontal position. When it touches the contact 61, the weight is caused to move to the right (in the drawings), when it touches 62, the direction of rotation of the motor 54 is reversed so that the weight will be moved to the left. The motor will remain in motion until the pendulum 60 floats freely between the contacts 61 and 62 in the neutral zone.

In the float of the gyroscopic compass are mounted gyroscopes 64 which increase the periods of oscillation of the gyroscopic system to about 5000 seconds, and are provided with devices for damping these oscillations the operation of which depends on the position or movement of the gyroscope axis relatively to the horizon. In order that the device described and diagrammatically illustrated in Figure 6 should not affect the damping of the gyroscopic system, it is necessary that the movement of the weight 57 should take place exceedingly slowly, namely, so slowly that the pendulum 59 should integrate not only over the short oscillations which it makes on board ship owing to engine vibrations, rolling and the like, but also over several oscillation periods of the compass amounting each to 5000 seconds. The time of settling or steadying of the described automatic regulation must be namely a multiple of the time of settling for the swinging in of the compass into the meridian. In consideration of these circumstances, I combine suitable damping means well known in the art, with the pendulum 60.

What I claim is:

1. A gyroscopic compass, comprising a support, a gyroscopic system supported thereby for movement about the three principal axes, a follow-up system carried by the support including a member mounted for movement about the three principal axes, follow-up motors operatively connected to the follow-up system for moving the member about the three axes, and a controlling mechanism for said motors including electrical elements in the circuits of the motors carried by the gyroscopic system, second electrical elements in the said circuits carried by the follow-up system, and a single conducting medium extending between the first and second elements and included in the said circuits, whereby the motors restore the elements and member to predetermined normal position relatively to the gyroscopic system upon relative displacement between them and said system.

2. A gyroscopic compass, comprising a relatively fixed support, a gyroscopic system mounted on the support for movement about the three principal axes, a follow-up system including three members, the first of which is movable about the three corresponding axes, three motors for moving the members to maintain the first member in fixed position relatively to the gyroscopic system, electrical contact elements carried by the gyroscopic system, second electrical contact elements carried by the follow-up system, a single conducting medium extending between the first and second contact elements, and control means for the motors having a circuit including the elements and the medium and being responsive to displacement between the first and second elements and the gyroscopic system to control the motors for restoring the elements and first member to predetermined position relatively to the gyroscopic system.

3. In a gyroscopic compass, the combination of a relatively fixed support, a gyroscopic system mounted on the support for movement about the two principal horizontal axes, a follow-up system carried by the support for movement about the two principal horizontal axes, spaced conducting elements carried by the follow-up system, corresponding spaced second conducting elements carried by the gyroscopic system, the first and second elements being displaced with respect to each other upon movement of the support about the said horizontal axes, two motors operatively connected to the follow-up system for moving it about the corresponding horizontal axes, a single conducting medium extending between the first and second elements, and a control means for the motors having a circuit including the elements and the medium, whereby the motors are energized to move the follow-up system about the corresponding horizontal axes in response to displacement between the first and second elements.

4. In a gyroscopic compass, the combination of a relatively fixed support, a gyroscopic system on the support for movement about the three principal axes, a follow-up system mounted on the support and including a member movable about the two principal horizontal axes, a driving mechanism operatively connected to the member for moving it about both of said horizontal axes, and electrical control means for said mechanism including spaced conducting elements carried by the follow-up system, corresponding spaced second conducting elements carried by the gyroscopic system, the corresponding first and second elements being displaced upon movement of the support about the principal horizontal axes, and a single conducting medium between the first and second elements, said elements and medium being in the circuit of said control means for causing the driving mechanism to actuate the member to maintain it in fixed position relatively to the gyroscopic system.

5. In a gyroscopic compass, the combination of a relatively fixed support, a gyroscopic system mounted on the support for movement about the three principal axes, a follow-up system mounted on the support and including three interconnected members corresponding to the three principal axes, a motor for actuating each of said members, three sets of corresponding contacts on the follow-up system and the gyroscopic system displaced with respect to each other upon movement of the support about the corresponding axes, a single conducting medium between the contacts of each set, a control means in circuit with said motors and contacts for severally controlling the motors upon displacement between the contacts of the corresponding contact sets for actuating the corresponding members to cause the follow-up system to follow the movement of the gyroscopic system.

HERMANN ANSCHÜTZ-KAEMPFE.